July 16, 1963

R. KAISER 3,097,823

SHUTOFF COCK HAVING A SPHERICAL PLUG

Filed Sept. 14, 1960

Inventor:
Rudolf Kaiser,
By Ernest B. Marmorek
His Attorney.

_United States Patent Office_

3,097,823
Patented July 16, 1963

3,097,823
SHUTOFF COCK HAVING A SPHERICAL PLUG
Rudolf Kaiser, Rohrerweg 18, Ettlingen, Baden, Germany
Filed Sept. 14, 1960, Ser. No. 56,001
Claims priority, application Germany Oct. 28, 1959
7 Claims. (Cl. 251—172)

This application is a continuation-in-part of application Serial No. 777,756, filed December 2, 1958, now Patent No. 3,047,265 granted July 31, 1962.

Various kinds of rubber, such as for example "Perbunan" and "neoprene," are used for the sealing of spherical-plug cocks. Depending on the kind and temperature of the medium flowing through the spherical-plug cocks, these rubber seals age prematurely, are destroyed, swell up or shrink. There are in fact synthetic plastic materials—such as the polytetrafluorethylene which is known under the trade name "Teflon"—which are almost completely resistant to chemical attack and withstand temperatures of from −150° to +250° C. But these materials are scarcely usable as material for elastic packings since they are bone-hard, have a tendency to so-called cold flow, and their increase in volume under the action of heat is relatively considerable. Owing to the last-mentioned property, packings of relatively considerable volume lose their pre-stressing under changing temperatures and then no longer provide sealing-tightness.

The object of the invention is to construct a sealing arrangement for shutoff cocks having a spherical plug, in such a manner that the above-mentioned disadvantages of rubber packings are avoided and the advantages of the aforesaid heat-stable and chemically stable synthetic plastic material can be utilized.

The solution of this problem according to the invention consists in that, for sealing the outer periphery of the piston-type packing rings relatively to the closure sleeves of the cock housing and for sealing the latter relatively to the operating shaft of the spherical plug, wedge rings are used and that these are loaded by spring pressure and by the pressure of the flowing medium, have a relatively small volume and consist of heat-stable and chemically stable synthetic plastic material (for example polytetrafluorethylene). The sealing unit consisting of two plastic wedge rings arranged with their inclined surfaces facing one another, a pressure ring arranged in front of each of these and loaded by the throughflowing medium, and of springs directed in opposition to one another and each pressing one of the said pressure rings against the wedge rings, is arranged in a recess on the outer periphery of the piston-type packing rings.

Arranged between the plastic wedge rings facing one another with their inclined surfaces is a ring which is provided with inclined surfaces at its inner and at its outer periphery and whose inclined surfaces have the same angle of inclination as the inclined surfaces of the plastic wedge rings. The sealing unit, mounted in a recess on the outer periphery of the piston-type packing ring, can consist of two pressure rings which are loaded by the flowing medium and are provided with conically tapering ends inclined towards one another and with holes for receiving oppositely directed bearing springs, and whose inclined surfaces are pressed against the inclined surfaces of the two wedge rings, which have a triangular cross-section and whose broad sides bear against the annular surfaces to be sealed.

By the arrangement of the spring-loaded plastic wedge rings in the sealing unit constructed according to the invention, the bone hardness of the polytetrafluorethylene which is used and its volume variation under the influence of heat no longer affect the sealing arrangement, and only its advantages make themselves felt. The self-lubricating property of the aforesaid material has the result that despite the high pressure acting on the sliding surfaces of the wedge packing rings, the surfaces which are to be sealed relatively to one another do not seize or grind on one another.

Some examples of embodiment are illustrated diagrammatically in longitudinal sectional view in FIGURES 1 to 5.

Figure 1:
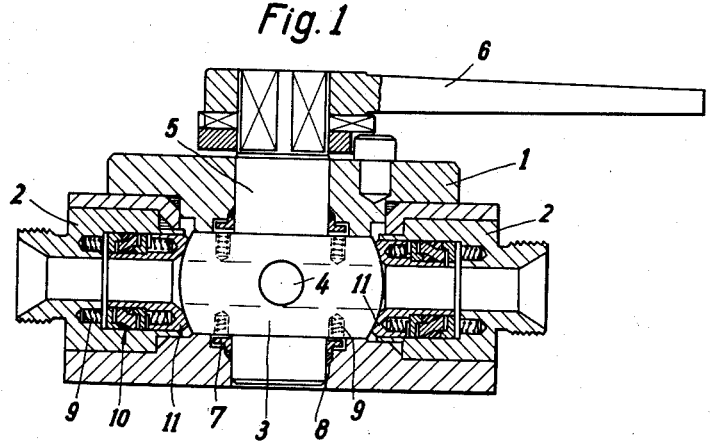
FIGURE 1 shows a longitudinal sectional view, taken both through the housing axis and also through the axis of rotation of the spherical plug, of the spherical-plug cock constructed according to the invention.

The spherical plug 3 is mounted in the housing 1 of the shutoff cock by means of two pivots which are arranged perpendicularly to its throughflow bore 4, and the upper of which is constructed as the operating shaft 5. The operating lever 6 is fixed on the square end of the said shaft where it projects from the housing 1. The two piston-type packing rings 11 bear on the spherical surface of the plug 3, co-axially with the throughflow bore 4. These rings are mounted to be axially displaceable in recesses in the closure sleeves 2 of the cock housing 1. The closure sleeves 2 can be fixed in the housing 1 either by means of screwthreading or by locating pins. The way in which they are fixed is not shown in FIGURE 1, in order to make the figure easier to read.

The piston-type packing rings 11 comprise at their outer periphery recesses 11′ in each of which is mounted a sealing unit 10 which is at both sides under the pressure of springs 9. These are arranged both in axial bores of the piston-type packing ring and also in axial bores of the closure sleeves 2 of the housing 1.

In this way, the sealing unit 10 is under a permanent, relatively high pressure which is further intensified by the pressure of the medium flowing through the shutoff cock.

Figure 2:
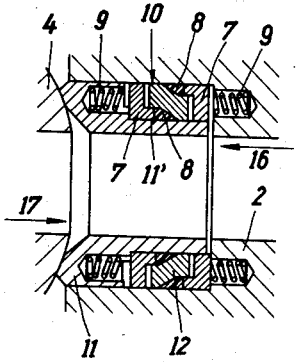
FIGURE 2 shows a sealing unit of this spherical-plug cock on a larger scale.

As FIGURE 2 shows, the sealing unit 10 has two pressure rings on whose outer sides the springs 9 bear and whose mutually facing inner sides transmit the spring pressure and the pressure of the flowing medium to the two plastic wedge rings 8. Situated between these two wedge rings is the intermediate ring 12 which is provided at its inner and outer peripheries with inclined surfaces. Its inclined surfaces have the same angle of inclination as the inclined surfaces of the plastic wedge rings 8.

In the upper part of FIGURE 2, the position of the sealing unit is shown when it is being acted upon by the pressure of the flowing medium from the right in the direction of the arrow 16, whilst the lower part of FIGURE 2 shows the position of the sealing unit 10 when the pressure of the flowing medium is acting in the direction of the arrow 17. Thus when subjected by pressure from either side the sealing unit is always displaced in the pressure direction within the recess 11′ of the packing ring 11. Since the surface of the latter ring acted upon by the flowing medium is always greater than its sealing surface on the spherical plug 3, in this way an additional sealing pressure is thus obtained and therefore an excellent fluid-tightness.

Figure 3:
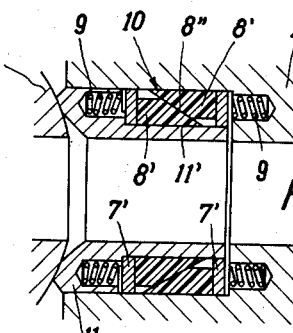
FIGURES 3 and 4 show two constructional modifications of the sealing unit.

In the example of embodiment shown in FIGURE 3, there is no intermediate ring 12. The inclined surfaces 8″ of the two plastic wedge rings 8′ bear directly on one another. Their radial width is smaller than that of the recess 11′ of the piston-type packing ring 11, in order that if the wedge rings 8′ undergo a modification in volume owing to the action of heat the sealing unit 10 does not become inoperative. The pressure rings on which the springs 9 bear are constructed as simple annular discs 7'.

Figure 4:
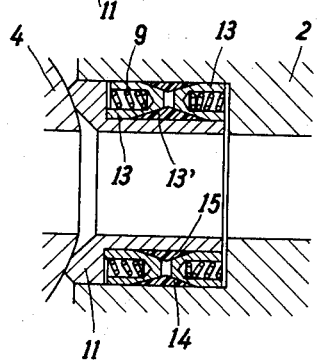

The example of embodiment shown in FIGURE 4 shows the use of two plastic wedge rings 14 and 15 of triangular cross-section. These bear with their wide sides on the annular surfaces of the packing rings 11 and of the cock housing closure sleeve 2 which are to be sealed. The two pressure rings 13 comprise at their mutually facing sides at the inner and outer periphery inclined surfaces 13' which bear against the inclined surface of the aforesaid two wedge rings 14 and 15. They are provided at their side remote from the wedge rings 14 and 15 with holes for accommodating oppositely directed bearing springs 9, and are also under the pressure of the medium flowing through the shutoff cock.

In the examples of embodiment of the sealing unit 10 shown in FIGURES 2, 3 and 4, the pressure of the springs 9 and the pressure of the medium flowing through the shutoff cock press the wide sides of the plastic wedge rings against the annular surfaces which are to be sealed.

Figure 5:
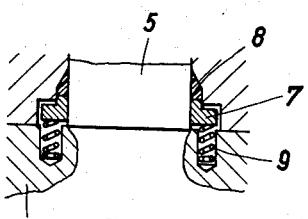
FIGURE 5 shows a simple wedge-ring seal for the operating shaft of the spherical plug.

In FIGURE 5 there is illustrated a simple seal for the operating shaft 5 of the spherical plug 3. This seal consists of the wedge ring 8, whose base surface rests on a pressure ring 7 which in its turn is under the pressure of springs 9 which are held in holes in the spherical plug 3 which extend perpendicularly to the axis of the throughflow bore 4 in the said plug.

I claim:
1. A shut-off cock for a flowing medium, comprising a housing having inflow and outflow openings therein, a spherical plug in said housing for sealing said openings, a piston-type packing ring arranged coaxially in each of the respective openings in said housing, the rear side of the packing ring being under the pressure of the flowing medium and also under spring pressure, and means for sealing the outer periphery of the packing rings, said means comprising oppositely spring pressed interengaging conical wedge rings which are loaded by the spring pressure and by the pressure of the flowing medium and are of relatively small volume and consist of heat-stable and chemically stable synthetic plastic material.

2. A shut-off cock as claimed in claim 1, wherein the synthetic plastic material is polytetrafluorethylene.

3. A shut-off cock as claimed in claim 1 wherein closure sleeves are provided in the cock housing and the piston-type packing rings are guided in recesses in said sleeves.

4. A shut-off cock as claimed in claim 1, wherein the sealing means consists of two synthetic plastic wedge rings facing towards one another with their inclined surfaces, a pressure ring loaded by the flowing medium and arranged in front of each said wedge ring, and springs which are directed in opposition to one another and which each press one of the said pressure rings against the wedge rings.

5. A shut-off cock as claimed in claim 1, wherein the sealing means are arranged in a recess on the outer periphery of the piston-type packing ring.

6. A shut-off cock as claimed in claim 1, wherein, between the plastic wedge rings facing towards one another with their inclined surfaces there is arranged a ring which is provided at its inner and outer peripheries with inclined surfaces and whose inclined surfaces have the same angle of inclination as the inclined surfaces of the plastic wedge rings.

7. A shut-off cock as claimed in claim 1, wherein the sealing means mounted in a recess on the outer periphery of the piston-type packing ring, consists of two pressure rings which are loaded by the flowing medium and are provided with conically tapering ends inclined towards one another and with holes for accommodating bearing springs arranged in opposition to one another, and whose inclined surfaces are pressed against the inclined surfaces of the two wedge rings which have a triangular cross-section and whose wide sides bear against the annular surfaces which are to be sealed.

References Cited in the file of this patent
UNITED STATES PATENTS

| | | |
|---|---|---|
| 2,548,128 | Snyder | Apr. 10, 1951 |
| 2,558,087 | Holl | June 26, 1951 |
| 2,747,834 | Meusy | May 29, 1956 |
| 2,919,886 | Hurst | Jan. 5, 1960 |
| 2,929,606 | Kaiser | Mar. 22, 1960 |
| 2,946,552 | Mancusi | July 26, 1960 |

FOREIGN PATENTS

| | | |
|---|---|---|
| 1,208,681 | France | Sept. 14, 1959 |
| 1,222,752 | France | Jan. 25, 1960 |